J. W. DUNLAP.
TYPE WRITER.
APPLICATION FILED MAY 2, 1910.
1,009,392.
Patented Nov. 21, 1911.
5 SHEETS—SHEET 1.
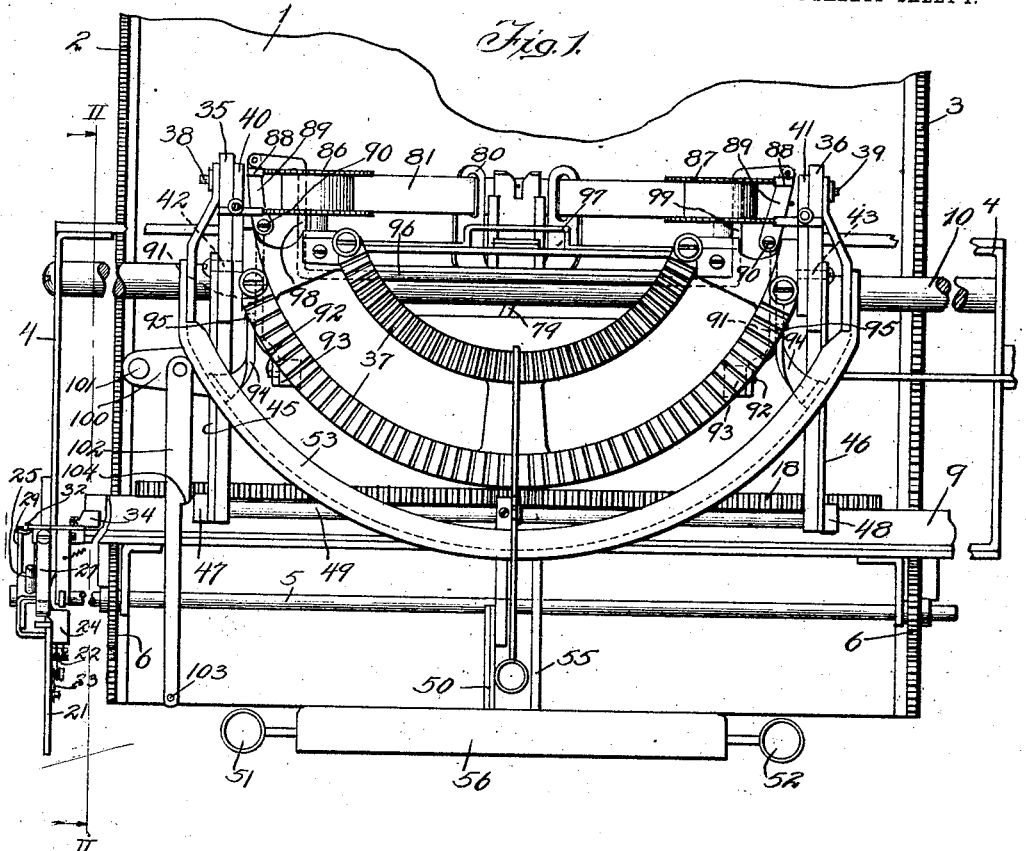
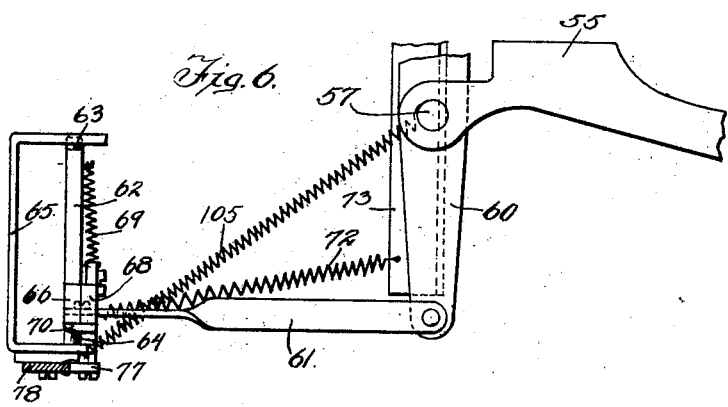
Witnesses:
Inventor:
John W. Dunlap
By Brown Hopkins
Atty's.

J. W. DUNLAP.
TYPE WRITER.
APPLICATION FILED MAY 2, 1910.
1,009,392.
Patented Nov. 21, 1911.
5 SHEETS—SHEET 2.
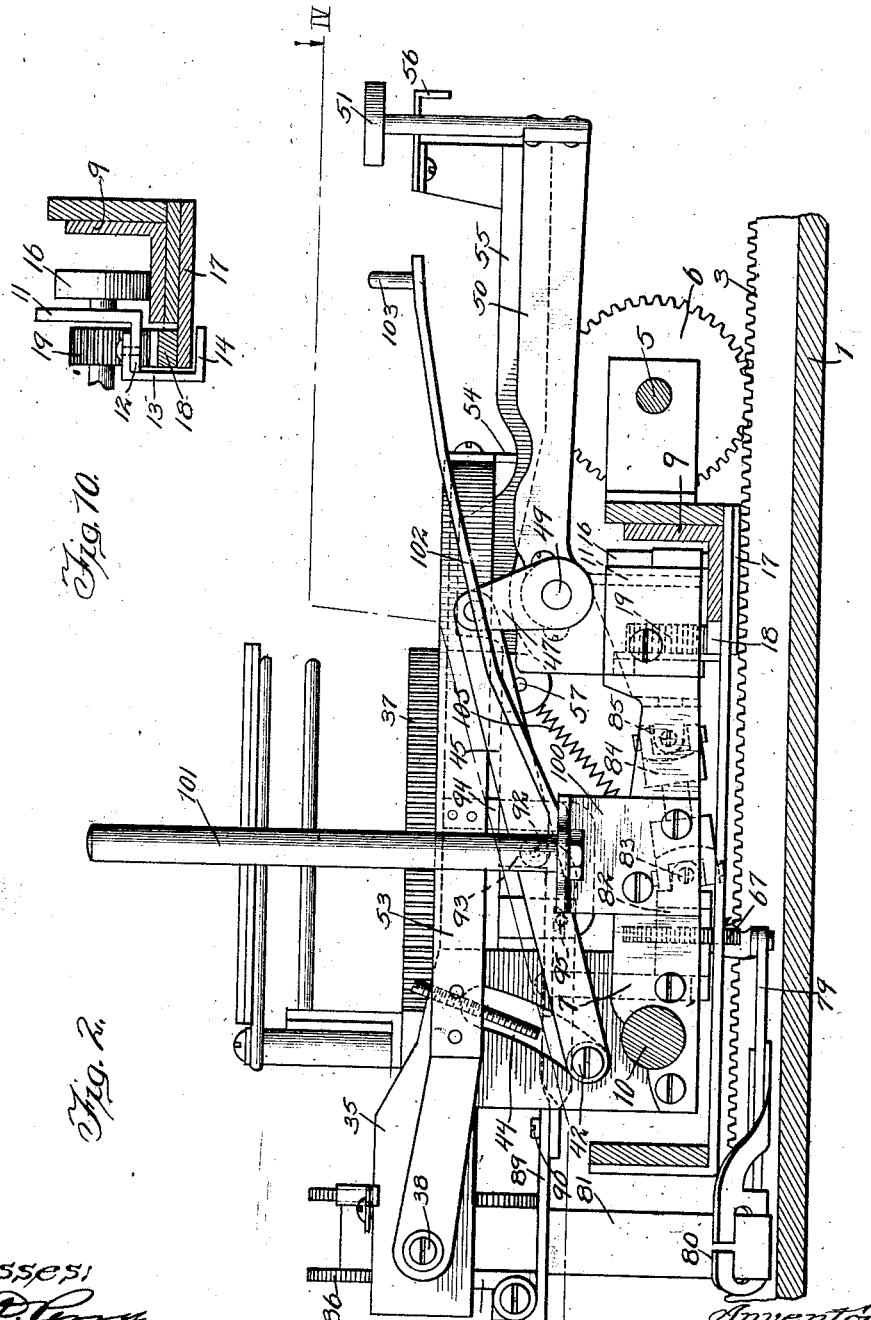

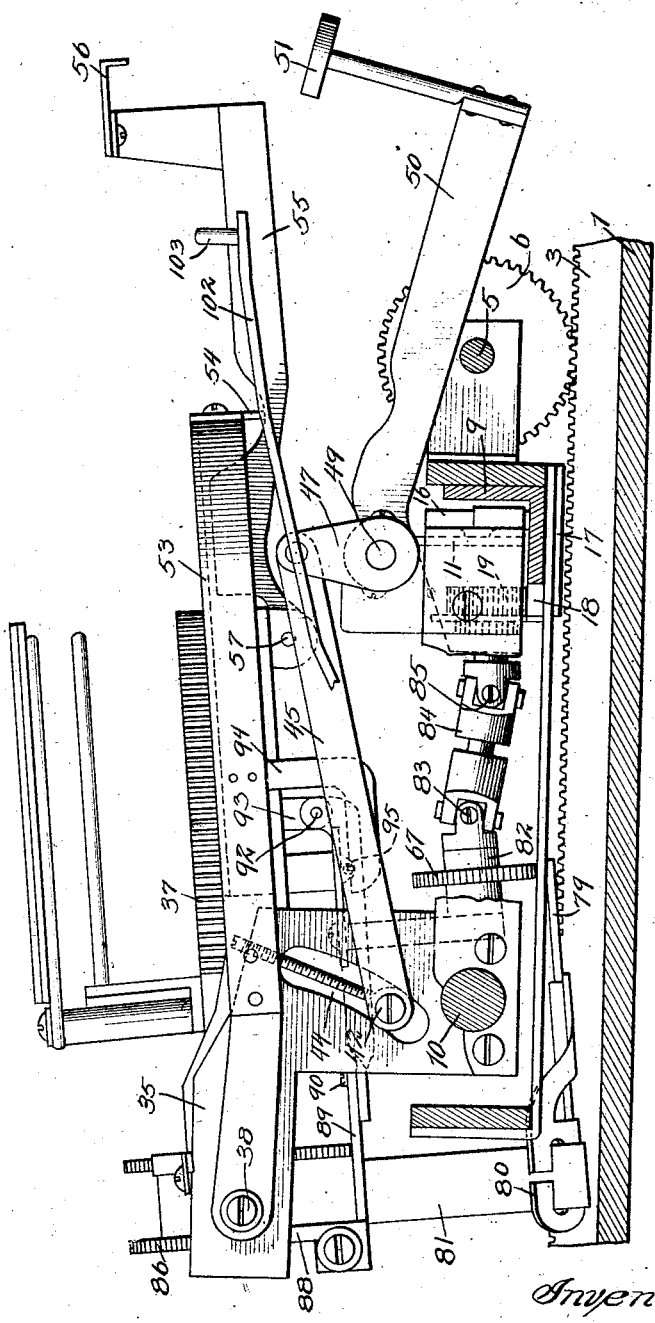

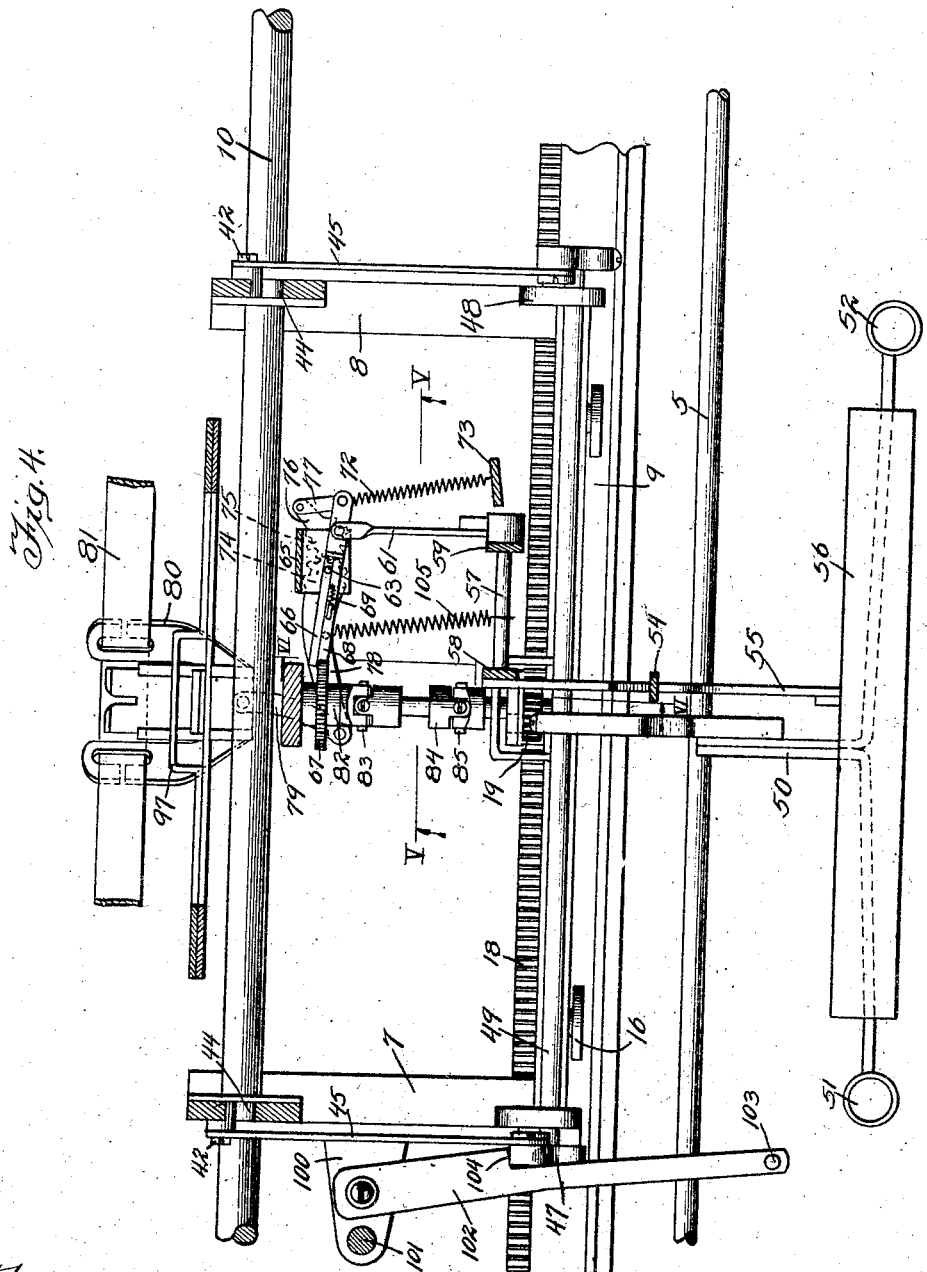

J. W. DUNLAP.
TYPE WRITER.
APPLICATION FILED MAY 2, 1910.
1,009,392.
Patented Nov. 21, 1911.
5 SHEETS—SHEET 5.
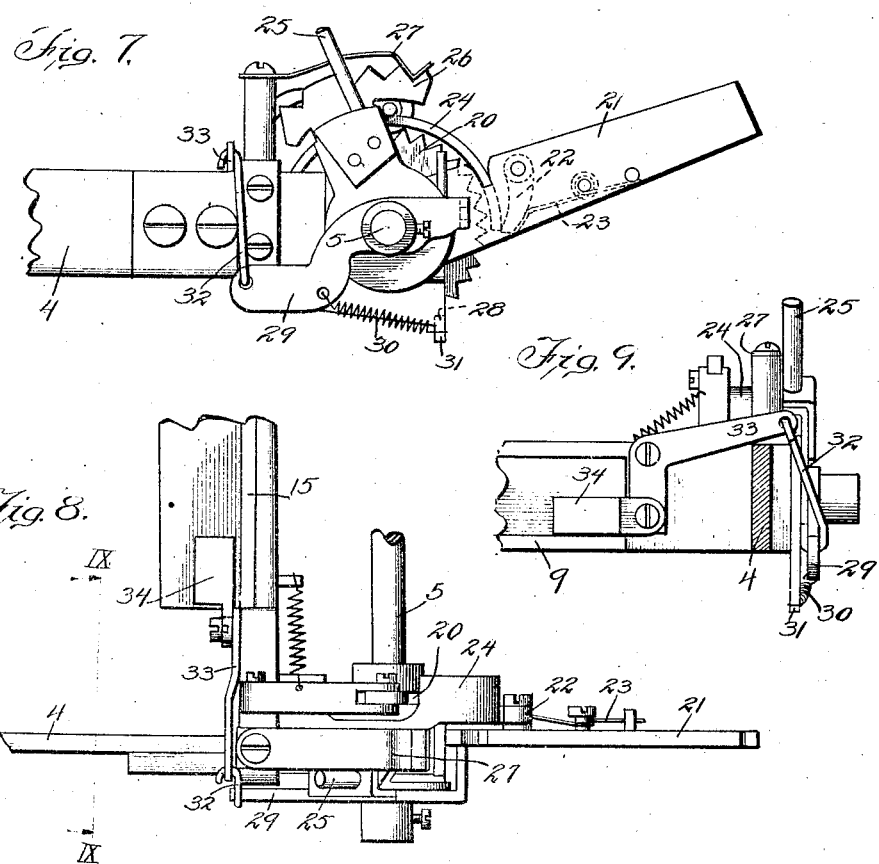
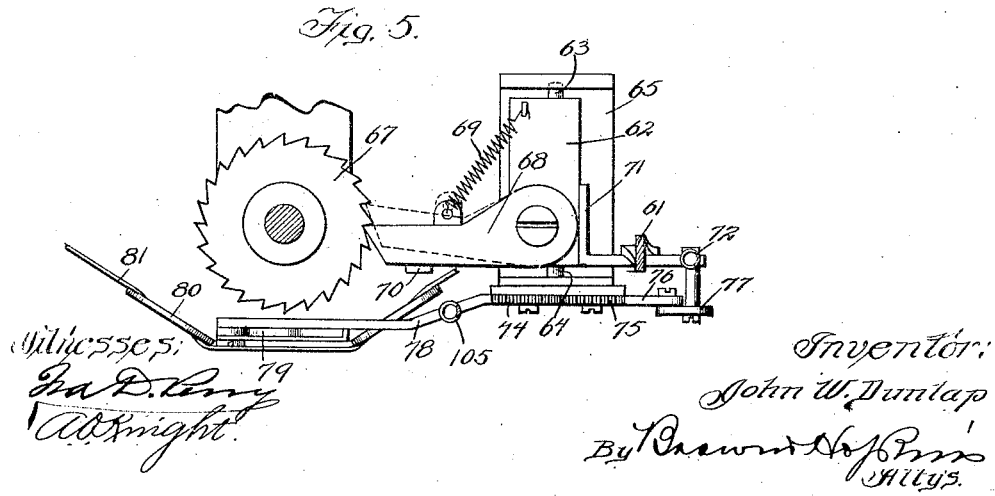

UNITED STATES PATENT OFFICE.

JOHN W. DUNLAP, OF CHICAGO, ILLINOIS, ASSIGNOR OF ONE-HALF TO CLARENCE C. TRAVIS, OF CHICAGO, ILLINOIS.

TYPE-WRITER.

1,009,392.      Specification of Letters Patent.      Patented Nov. 21, 1911.

Application filed May 2, 1910. Serial No. 559,032.

*To all whom it may concern:*

Be it known that I, JOHN W. DUNLAP, a citizen of the United States, residing at Chicago, in the county of Cook and State of Illinois, have invented certain new and useful Improvements in Type-Writers, of which the following is a specification.

This invention relates to typewriters, and has for its primary object to provide an improved construction, combination and arrangement of parts in a typewriter.

One of the objects is to provide improved feed escapement and spacing bar mechanisms for a typewriter.

Another object is to provide improved line spacing means for a book-typewriter.

Another object is to provide an improved construction, combination and arrangement of parts in a carriage-shifting mechanism for book-typewriters.

Another object is to provide improved ribbon-feeding and reversing mechanisms.

Other and further objects will appear in the specification and be specifically pointed out in the claims, reference being had to the accompanying drawings exemplifying the invention, and in which—

Figure 1 is a top plan view of a book-typewriter constructed in accordance with the principles of this invention. Fig. 2 is a section on the line II—II of Fig. 1, with the parts in normal position. Fig. 3 is a similar view with the carriage in raised position, the end bar of the line spacing frame, together with parts carried thereby being removed in order to more clearly show some of the interior mechanism of the machine. Fig. 4 is a section on the line IV—IV of Fig. 2. Fig. 5 is a section on the line V—V of Fig. 4. Fig. 6 is a section on the line VI—VI of Fig. 4. Fig. 7 is a side elevation of the line-spacing mechanism. Fig. 8 is a top plan view of the same. Fig. 9 is a section on the line IX—IX of Fig. 8. Fig. 10 is a detail section through the front members of the line spacing frame and the carriage.

Referring to Fig. 1, the parts of a book-typewriter shown therein as an exemplification in one embodiment of the present invention, comprises in general with well known machines of the same kind, a platen 1 provided with line-spacing racks 2 and 3. The platen 1 may furthermore be provided with suitable guides or ways for reciprocably mounting a line-spacing frame 4, said frame having rotatably mounted thereon a spindle 5 for mounting the feed pinions 6—6. Feed pinions 6 mesh with the feed racks 2 and 3 for the line-spacing movement.

Referring more especially to Figs. 1, 2, 3 and 4, a carriage frame comprising end bars 7 and 8 rigidly connected in front by an angle bar 9, is reciprocably mounted on the line-spacing frame to traverse the platen 1 by having said end bars 7 and 8 slidably engaging a slide bar 10 forming a rigid portion of the line-spacing frame 4. The front bar 11 of the carriage is preferably constructed in the form of an angle bar upon the inwardly projecting arm 12 of which is secured a hold 13 of substantially U-shape, the lower depending end 14 of which extends outwardly under the front member of the line spacing frame and limits the upward movement of the carriage relatively to the line spacing frame. The front member of the line spacing frame includes the angle bar section 9, with one arm of said section projecting inwardly to form a horizontal run-way for rollers 16 which are rotatably mounted on said carriage. Rigidly secured to the bottom of said front member of the line-spacing frame is a strap or bar 17 upon the inner edge of which is mounted a traversing feed rack 18 with which meshes a pinion 19 which is rotatably mounted on the carriage and connected in a manner to be hereinafter referred to, to the escapement mechanism also mounted on the carriage. The hold 13 permits just enough play between the carriage and line-spacing frame as will permit the pinion 19 to be lifted out of engagement with the rack 18 to permit the ready adjustment in position of the carriage upon the line-spacing frame. This adjustment can be effected by simply lifting upwardly the shifting lever and spacing bar to be presently referred to.

Referring now to Figs. 7, 8, and 9, the line-spacing mechanism which is arranged at the lower left hand corner of the line spacing frame 4, as shown in Fig. 1, consists of means for rotating the spindle 5 on said frame to move it along the racks 2 and 3. Said mechanism is adapted to be operated by hand, or automatically by the shifting movement of the carriage and preferably consists of a ratchet 20 secured to the spindle 5 in any suitable manner. Oscillatably mounted on the spindle 5 is a hand lever 21 provided with a pawl 22 pressed inwardly by a resilient member 23. Also oscillatably mounted on the spindle 5 is a shield or guard 24 which, by means of a thumb hold 25 may be interposed between the ratchet 20 and the pawl 22 to prevent such pawl from engaging the said ratchet. A comb-like piece 26, which is rigidly secured to the shield or guard 24, is resiliently engaged by a spring 27 which resiliently holds said guard in any position to which it may be adjusted. The hand lever 21 when pushed downwardly is limited in its downward movement by a lug 28 (see Fig. 7). It will therefore be seen that owing to the limited movement of the lever 21, the guard 24 may be disposed in such positions as will prevent the pawl engaging the ratchet 20 altogether, or will permit said pawl to engage the ratchet during a sufficient portion of its movement to move it one tooth, or to move it two or more teeth, as may be desired. The line-spacing movement is therefore an adjustable one. Oscillatably mounted on the spindle 5 and rigidly secured to the hand lever 21, is a rearwardly projecting lever 29, the movement of which is resiliently resisted by a spring 30 connected at one end to a projection 31 rigidly mounted on the line-spacing frame. By means of links 32, 33, the latter being preferably in the form of a bell crank lever, the lever 29 is operably connected with a movable abutment 34, which is reciprocably mounted on the front guide bar 9 of the line-spacing frame in the line of movement of the carriage on said frame. It will therefore be seen that upon each return movement of the carriage, the line-spacing mechanism may be operated by said carriage.

Referring more especially to Figs. 1, 2 and 3, the traversing carriage is provided with a pair of side frames or standards 35 and 36 rigidly mounted thereon. A key and type-bar segment denoted generally by the reference character 37 is swingingly mounted between said side frames by pivotal connections at 38 and 39. Said segment is thereby adapted to be shifted from one case position to another to cause the type-bars to strike the platen in alinement. Slidably engaging the inner faces of the side frames 35 and 36 are plates 40 and 41 provided with pins 42 and 43 projecting through arcuate slots 44 in said side frames 35 and 36. Pivotally connected to the outer ends of said pins 42 and 43 are links 45 and 46, which are in turn pivotally connected to the outer ends of crank arms 47 and 48 respectively, said crank arms being rigidly mounted on an oscillable shaft 49. For oscillating said shaft 49 to shift the carriage any suitable shifting lever may be provided, said lever in the embodiment shown in the drawings comprising a substantially T-shaped lever 50 having its shank rigidly connected to the shaft 49 and provided on the outer ends of the cross bar with finger pads 51 and 52. A universal bar 53 is pivotally mounted at its outer ends on the pivots 38 and 39 and provided in front with a projection 54 (see Figs. 2 and 3) which bears against a spacing lever 55, the outer end of said lever 55 being provided with a spacing bar 56.

Referring now to Figs. 4, 5 and 6, the construction and arrangement of parts in the spacing mechanism will be understood. The spacing lever 55 is rigidly secured to an oscillatable shaft 57 mounted in supports 58 and 59 depending from the under side of the segment 37. The crank arm 60 rigidly secured to the shaft 57, is pivotally connected at its outer end with a link 61 by means of which it is adapted to oscillate the dog 62 of the escapement mechanism. Said dog 62 comprises a vertically disposed bar portion provided with upper and lower bearing pins 63, 64, by means of which it is pivotally mounted in a rigid support 65 depending from the segment 37. Said dog is, moreover, provided with a rigid projecting portion 66 which engages the teeth of a ratchet 67, said ratchet 67 being connected in a manner presently to be described with a rack and pinion feed for effecting the traverse feed of the carriage. Pivotally mounted upon the dog 62 is a pawl 68, which, when it is not held in lowered position shown in full lines in Fig. 5 by the ratchet 67, is drawn upwardly into the position shown in dotted lines by a spring 69. The lateral projection 70 rigid with the projecting portion 66 of said dog, serves as a stop for the pawl 68. Rigidly connected to the dog 62 is an angle bracket 71, to the projecting horizontal portion of which the link 61 is pivotally connected. A spring, or other resilient member 72 is connected at one end to the outer end of the horizontal arm of the bracket 71 and at its other end to a depending bar 73 rigid with the segment 37. Said spring 72 acts normally to hold the projecting portion 66 of the dog out of engagement with the ratchet 67, so that the pawl 68 is normally held in lowered position shown in Fig. 5. When the universal bar 53 of the spacing bar 56 is actuated, the rigid portion 66 of the dog is swung into engagement with a tooth of the ratchet 67 when the pawl 68 swings upwardly into dotted line position shown in Fig. 5, in which position it is adapted upon the return of the several parts to normal position to be engaged by the next tooth to feed the carriage.

Pivotally mounted below on the support 65, is a pair of segmental gears 74, 75, the latter being provided with an arm 76 connected by a link 77 with the oscillating dog 62, so as to partake of all its movements. Rigidly connected to the gear 74 is a rearwardly projecting lever 78 to the outer end of which is pivotally connected a link 79 for reciprocating a ribbon holder 80 through which is fed a ribbon 81. Said ribbon holder 80 is reciprocably mounted on a part rigid with the segment 37. Referring more especially to Figs. 1, 2 and 3, the ratchet 67 is provided with a stub shaped projection 82, which is connected by a universal coupling 83 with an extensible shaft 84, said extensible shaft being connected by a universal coupling 85 with a feed pinion which meshes with the rack 18, as hereinbefore pointed out.

As best shown in Figs. 1, 2 and 3, the ribbon feeding and reversing mechanism comprises the spools 86, 87 for holding the ribbon, said spools being provided around their peripheral edges with ratchet teeth, and means for rotating said spools step by step, said means comprising on the left side of Fig. 1, a spring pawl 88 carried by a support 89, which is pivotally mounted at 90 upon an arm 91, in turning pivotally mounted at 92 upon a depending support 93 rigid with the type bar segment 37. In order to provide means for oscillating the arm 91 upwardly and downwardly, an angle bar 94 rigidly connected to and depending from the universal bar 53, is provided at its outer end with a pin 95, which engages the arm 91, so that at each movement of the universal bar 63, the spring pawl 88 is moved upwardly and downwardly to rotate the spool 86. The spring pawl 88, in conjunction with a similar spring pawl upon the opposite side of the carriage, is movable into and out of operative engagement with the ribbon spools by means for oscillating the supports 89 toward and away from said spools. Said means consists of a link preferably in the form of a wire 96, which is pivotally connected at its ends with the supports 89. The wire 96 is bent intermediately of its ends substantially in U shape, and a ribbon feed shifting lever 97 is reciprocably mounted on the segment 37 with its ends abutting against the parallel portions 98, 99 of the wire 96. Said shifting lever 97 is provided with an offset portion at the center, adapting said lever to be gripped between the finger and thumb of the operator's hand.

The herein described and illustrated construction, combination and arrangement of parts, has been disclosed as an exemplification of the invention, and I therefore do not wish to be limited to the specific construction and arrangement of parts hereinbefore referred to.

On the left end bar 7 of the carriage is rigidly mounted a bracket 100, upon the outer end of which is supported a vertically projecting rod 101, by means of which the carriage may be drawn from right to left in returning said carriage to initial position. Pivotally mounted on the bracket 100 is a retaining lever 102 which is provided on its outer end with a handle 103. Said lever 102 is provided with a shoulder at 104 adapted to fit in behind the crank arm 47 when the type bar segment is in raised position on the carriage.

What I claim is—

1. In a book typewriter, the combination of a feed rack, a reciprocating carriage having a pinion meshing with said rack, a type bar segment movable relatively to said carriage, said segment being provided with an escapement device, and a flexible connection between said pinion and escapement device.

2. In a book typewriter, the combination with a stationary frame having a feed rack, a carriage reciprocable on said frame and having a pinion meshing with said rack, a type bar segment movable relatively to said carriage, said segment being provided with an escapement device, and a flexible extensible connection between said pinion and escapement device.

3. In a book typewriter, the combination with a main frame having a feed rack, of a carriage reciprocable on said frame and having a pinion meshing with said rack, a type bar segment movable toward and away from said carriage, an escapement wheel carried by said segment, escapement dog mechanism mounted on said segment and operatively related to said escapement wheel, and an extensible shaft, said shaft being provided with a universal connection at one end with said escapement wheel and at the other end with said pinion on the carriage.

4. In a book typewriter, the combination with a frame having a feed rack, a carriage reciprocable on said frame and having a pinion meshing with said rack, a type bar segment movable toward and away from said carriage, said segment being provided with a universal bar and a feed escapement operatively related thereto, and an extensible shaft connecting said escapement with said pinion, said shaft being provided with universal joints adjacent each end.

5. In a book typewriter, the combination with a frame having a feed rack, a carriage reciprocable on said frame and having a pinion meshing with said rack, a type bar segment movable angularly toward and away from said carriage, said segment being provided with an escapement wheel, a feed dog mechanism coöperating therewith, and an extensible flexible connection between said escapement wheel and pinion.

6. In a book typewriter, the combination with a frame having a feed rack, a carriage reciprocable on said frame and having a pinion meshing with said rack, a type bar segment pivotally mounted on said carriage and provided with a feed escapement mechanism, and a flexible extensible connection connecting said escapement with said pinion, said carriage being pivotally mounted on said frame to permit the removal of said pinion out of engagement with said feed rack.

7. In a book typewriter, the combination with a frame having a feed rack, a carriage reciprocable on said frame and having a pinion meshing with said rack, a type bar segment pivotally mounted on said carriage and provided with a feed escapement mechanism, a flexible extensible connection connecting said escapement with said pinion, said carriage being pivotally mounted on said frame to permit the removal of said pinion out of engagement with said feed rack, and means for limiting the pivotal movement of said carriage.

In testimony whereof I have signed my name to this specification, in the presence of two subscribing witnesses, on this 18th day of April A. D. 1910.

JOHN W. DUNLAP.

Witnesses:
M. W. CANTWELL,
A. O. KNIGHT.